United States Patent [11] 3,607,595

[72] Inventor Leo J. Windecker
 Midland, Tex.
[21] Appl. No. 553,956
[22] Filed May 31, 1966
[45] Patented Sept. 21, 1971
[73] Assignee The Dow Chemical Company
 Midland, Mich.

[54] METHOD OF PRODUCING AERODYNAMICALLY SMOOTH SURFACES
 6 Claims, 1 Drawing Fig.
[52] U.S. Cl............................................. 161/119,
 161/190, 156/71, 156/293, 264/45, 244/126
[51] Int. Cl....................................... B32b 3/00
[50] Field of Search.......................... 161/119,
 190, 186; 156/71, 293; 244/126; 264/45

[56] References Cited
UNITED STATES PATENTS

| | | | |
|---|---|---|---|
| 2,888,360 | 5/1959 | Sherts et al. | 117/8 |
| 3,265,664 | 8/1966 | Fulmer et al. | 161/186 |
| 3,330,080 | 7/1967 | Grieb et al. | 52/86 |

Primary Examiner—Morris Sussman
Attorneys—Griswold & Burdick, Richard G. Waterman and William D. Miller ABSTRACT: Aerodynamically smooth surfaces are prepared by covering an irregular surface such as a riveted aircraft wing with a flexible foam embedded with a thermosettable resin. The foam has a smooth outer layer of resin. Pressure is applied to the smooth outer layer of resin to deform the foam layer and cover the surface irregularities.

PATENTED SEP 21 1971　　　　　　　　　　　　　　　3,607,595
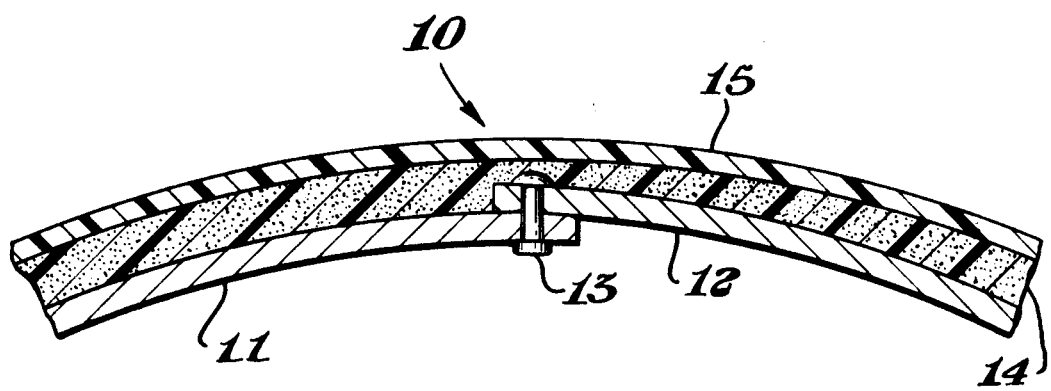
INVENTOR.
Leo J. Windecker
BY
W. D. Miller
ATTORNEY

METHOD OF PRODUCING AERODYNAMICALLY SMOOTH SURFACES

This invention relates to a method of producing a smooth surface over a base member having surface irregularities thereon. More specifically, the invention concerns the use of a thin layer of a hardenable foam to cover the irregularities and the sealing of the foam layer with a tough, smooth layer of a thermoset resin.

Aircraft wings, fuselages, etc. are covered with segments of aluminum sheeting which can be cut and shaped to produce a member having the desired shape when joined together and attached to the airframe by rivets. Great care must be taken in assembling these members to minimize air turbulence at the seams and riveted joints.

According to this invention, a method has been developed to conceal minor surface irregularities whereby an aerodynamically smooth surface is exposed. In addition to making the surface smoother, it is also more rigid thereby reducing surface vibration and resonance which cause parasitic drag in aircraft and other high-speed vehicles.

The method by which the smooth surface is produced involves covering the irregular metal surface with a thin layer of a flexible plastic foam which has been treated with a thermosettable resin containing a curing agent so that the plastic foam will become rigid and bond to the metal surface when the resin becomes thermoset. Pressure applied to the foam layer as the resin is cured to the thermoset stage causes the flexible foam to deform and embody the surface irregularities, presenting a smooth outer surface on the foam layer. A layer of a thermoset resin covering the plastic foam provides the aerodynamically smooth surface. The resin skin over the foam also cooperates with the metal-foam laminate to provide a more rigid surface which is less subject to vibrations.

The attached drawing illustrates an irregular surface in cross section which has been covered with a smooth resin layer according to this invention.

In the drawing, metal sheets 11 and 12 are joined by rivet 13 in a lapped joint. Both the rivet head and the discontinuity where one sheet laps over the other would normally produce considerable turbulence and drag. The thin layer of foamed plastic 14 bonded between the metal sheets and resinous skin 14 deforms at these surface irregularities so that a smooth resin skin is exposed. It is important that the foam layer be bonded strongly both to the irregular metal surface and the resinous outer skin to avoid distortion of the aerodynamic shape.

The smooth surface can be prepared by any of several procedures and sequences of steps, however, one particularly convenient method is to prepare first a resinous skin having a smooth surface. It is usually desirable that the skin be reinforced with a fibrous material. A suitable reinforced resinous skin can be prepared by the layup technique. Resin and fibrous reinforcement are placed on a polished glass surface in a layer of the desired thickness. Before the resin has gelled the reinforced laminate is covered with a thin sheet of a flexible plastic foam. The partially cured resin is able to contact the irregular foam surface effectively and provide a strong bond. When the resin has cured, the laminate can be peeled from the glass and either used or stored for future use. If desired, a prepreg can be produced by partially curing the resin to a stage which is dry and nontacky at ambient conditions. The final cure can then be effected at an elevated temperature when the resin wetting the foam is cured. B-staged epoxy resins are particularly useful as prepregs.

Any of the fibrous materials commonly used to reinforce resins can be used to prepare the smooth outer skin. Among those fibrous materials which are suitable are fiber glass, nylon, asbestos, Dacron, paper, linen, Mylar, cotton linters and metal wires.

The irregular surface to be covered with the foam laminate must be thoroughly cleaned to remove grease and dirt before the laminate is applied. The surface preparation should be in accord with recommended practices for the particular adhesive which will be used.

The flexible foam is wetted with a thermosettable resin before it is applied to the cleaned surface. This wetting step is desirably carried out is a manner which provides a thin film of the resin on the surfaces of the open cells in the foam layer. This can be accomplished by kneading a low viscosity resin into the foam layer then expressing the excess resin by passage through a pair of rolls. It is preferable that the open cells of the foam are not left full of resin to avoid unnecessary weight in the laminate. A thin film of resin on the cellular surfaces generally will afford the necessary rigidity and strength when cured.

The wetted foam is then applied to the cleaned irregular surface. The resin wetting the foam is one which adheres well to the surface. The foam is pressed into substantially complete contact with the surface. Protrusions on the surface should embed in the foam and the foam should be pressed into crevices, indentations, and the like and held that way until the wetting resin is cured.

The flexible plastic foam used in practicing this invention can be an open-celled polyurethane, rubber or other type of flexible foam. It is desirable that the foam contain at least 50percent open cells so that a sufficient portion of its cellular structure can be wetted with a film of a thermosettable resin to rigidify the foam laminate.

Polyester and polyepoxide resins can be used to wet the foam and adhere it to the irregular surface. Polyepoxides, commonly referred to as epoxy resins, having sufficient fluidity at working temperatures for use with the foam, i.e. liquid epoxy resins, are those produced, for example, by the reaction of epichlorohydrin with a dihydric phenol such as 2,2-bis(4-hydroxyphenyl) propane in the presence of caustic and having an epoxy equivalent weight in the range from 180 to about 200. The fluidity of the resin can be increased by mixing the resin with a reactive diluent such as butyl glycidyl ether, phenyl glycidyl ether, etc. Methods of curing these resins are well known and techniques for curing them are taught by Lee and Neville, "Epoxy Resins," McGraw-Hill (1957).

During the time the resin wetting the foam is being cured, pressure can be applied to the foam laminate covering the irregular surfaces by any of several different techniques. For example, the outer smooth surface may be covered with a sheet of shrink film such as oriented polyvinyl chloride. When heat is applied to accelerate the cure of the resin in the foam and prepreg, the oriented film will shrink and apply pressure to the laminate. Another manner in which pressure can be applied is by placing on the laminate a weighted member of the same contour as the surface being coated. An inflated bag held against the laminate is another effective method of applying a uniform pressure. Sufficient pressure should be applied to embed into the foam layer any protrusions of the surface of the member being coated. Also, the foam should be pressed into minor depressions, cavities and the like without deforming the smooth layer of resin covering the foam.

The thickness of the layer of flexible foam used in practicing this invention should be selected in accordance with the maximum deviation from a smooth surface which is likely to be found on the structure being covered. Thick foam layers are to be avoided when possible owing to their alteration of critical design dimensions in the member being covered. If the maximum protrusion of rivets, bolts, etc. is about one sixteenth to three thirty-seconds inch, and there are no depressions of greater depth and breadth, a foam layer about one-eighth inch thick will provide a smooth surface. Narrow cracks at seams between metal plates are bridged by the foam so that it usually is not necessary to provide sufficient foam to fill the cracks.

A thin layer of an adhesive such as the resin used to wet the foam cells may be applied to the surface to bind the foam thereto or the film of resin which wets the foam can be relied upon to provide a bond between the foam sheet and the irregular surface.

Rather than follow the above procedure, the flexible foam wetted with a thermosettable resin can be applied to the aircraft wing or other surface to be coated then covered with a layer of reinforced resin and cured under appropriate confining pressure. In general, this alternative procedure does not produce the highly smooth surfaces so easily as the procedure where the foam-reinforced resin laminate is first prepared on a smooth surface then applied to the irregular surface. Mold release agents such as waxes and latexes are particularly useful in preparing the reinforced resinous skin having a smooth surface.

This method of producing a thin, smooth coating of a rigid, irregular surface is not only useful in aircraft but may also be used in the construction of rockets, boats, autos, trains, and other vehicles having irregular surfaces.

I claim:

1. The method of producing a smooth surface on a body having surface irregularities comprising:
    covering said body with a layer of a flexible plastic foam having its cellular surfaces wetted with a thin film of a thermosettable resin, said foam layer having a smooth outer layer of resin, adhered thereto,
    applying pressure to said smooth outer layer of resin to deform said foam layer and embody said surface irregularities therein, and
    maintaining said pressure until the resin is said flexible foam has become thermoset.

2. The method according to claim 1 wherein the irregular surface of said body is first coated with a film of a thermosettable resin to bond said plastic foam to said body.

3. The method of claim 1 wherein said flexible foam is an open-celled polyurethane foam and said thermosettable resin is a liquid epoxy resin.

4. A structure having an aerodynamically smooth surface comprising:
    a base member having minor surface irregularities thereon,
    a thin layer of a plastic foam adhered to the base member and embodying the surface irregularities, the foam layer comprising a flexible foam having a thin film of a thermoset resin coating the cellular surfaces of the foam, and
    a smooth layer of a thermoset resin adhered to the foam layer.

5. The structure of claim 1 wherein the plastic foam is an open-celled polyurethane foam and the thermoset resin coating the foam is an epoxy resin.

6. A method of producing an aerodynamically smooth surface on an aircraft surface having surface irregularities, the steps of the method comprising
    covering the aircraft surface with a layer of a flexible plastic foam having its cellular surfaces wetted with a thin film of thermosettable resin, the foam layer having a smooth outer layer of resin applied thereto,
    applying pressure to the smooth outer layer of resin sufficient to deform the foam layer and embody the irregularities therein and
    maintaining the pressure until the resin in the flexible foam is thermoset.